Patented Aug. 24, 1926.

1,597,301

UNITED STATES PATENT OFFICE.

NATHAN SULZBERGER, OF NEW YORK, N. Y.

COPYING AND TRANSFER MATERIAL AND METHOD OF PREPARATION.

No Drawing.　　Application filed October 27, 1922. Serial No. 597,430.

In my prior application, Serial No. 582,087 I describe, among other matters, the production of transfer pictures, prints, reproduction, etc. on asbestos paper, particularly asbestos paper prepared with colloidal aluminum silicate, etc.

The present invention relates to improvements in copying and transfer material and to methods of their preparation, and the present invention may be considered an improvement upon the invention of my said prior application.

The present invention relates particularly to composite articles and objects in which asbestos paper, and particularly asbestos paper prepared with colloidal aluminum silicate, etc., is used in combination with another layer of material to give composite prints and transfers which are suitable for specific uses, as for lantern slides to take the place, in certain cases, of glass plates and films, etc., and also for other purposes.

The present invention includes various composite articles in which asbestos paper is used in combination with another material or other materials, and I will describe specifically, by way of illustration, some of these combinations, without, however, limiting myself to these and to the specific process of their production as described below.

As an example and embodiment of the composite articles or objects of the invention I will describe the making of a slide which can be used in a magic lantern or motion picture projection apparatus:

A piece of asbestos paper of an absorbent character is first prepared. This may advantageously be prepared with the aid of colloidal aluminum silicate, although paper of a sufficiently absorbent character otherwise prepared may be used. Aluminum silicate is a salt-like compound or combination of alumina and silica, and, in a colloidal state, has valuable properties as a binder. When colloidal aluminum silicate suitably diluted with water, is admixed with asbestos fibre for the manufacture of paper, the colloidal solution of aluminum silicate has valuable properties as a binder and imparts valuable properties to the asbestos paper. The paper is absorbent and can by suitable treatment be converted into a translucent or transparent paper.

The sheet of asbestos paper was placed over a rotary photogravure print. A mixture of carbon tetrachloride and benzol was employed to moisten the asbestos until the print clearly appeared through. The solvent evaporates quickly. A glass plate, of proper size, and such as is used for lantern projection, was wetted on one side with sodium silicate solution (ordinary water glass with about one-half as much water added) and the asbestos paper with the absorbed image was smoothly placed on the plate, and permitted to dry. As a result there was obtained a composite picture suitable for projection. When this picture was placed in a magic lantern and the picture projected, it showed on the screen the picture and the matter of the original print, the asbestos paper, made with colloidal aluminum silicate, and attached to the glass plate with a layer of sodium silicate, being sufficiently translucent to permit the use of the picture in a projection machine.

Instead of using the picture produced as above described in a projection apparatus, it may be used as an ordinary negative for making photographic prints, it being only necessary, if a positive was placed on the paper to reverse such print, in a manner well known in photographic printing. In this way it is possible to make numerous reproductions from any material, the print of which contains ink and coloring matter which will be sufficiently absorbed by the asbestos paper, used in the way described.

Instead of using sodium silicate for securing the asbestos paper to the glass plate, other suitable adhesives may be employed, but I prefer, in many cases, to use the silicate, as it is non-combustible and strengthens the picture and improves it so that it can be better projected. Furthermore, the image on the asbestos is also well brought out by the use of sodium silicate solution of proper concentration, as the paper becomes quite transparent at places where little or none of the rotary photogravure ink has been absorbed, while at such points as the ink has been absorbed by the paper, the silicate is taken up little or not at all, especially when a dilute solution is employed. This action of the sodium silicate solution, whereby it is more absorbed by the parts of the asbestos paper which have not absorbed the rotary photogravure ink, can readily be noted, when taking the picture, and after copying from the rotary photogravure, by treating it with a dilute solution of sodium silicate, when it will be noticed that the asbestos paper will be differently affected where the ink has been absorbed from where it has not been absorbed. As a result, a peculiar "plastic" effect will be obtained, and it will appear as if the picture had been "embossed" on the paper. Instead of using pure sodium silicate in solution, mixtures may be used and coloring matter added to give a desired tint, etc.

In certain cases, instead of applying the asbestos paper with the image or picture on it to a glass plate, the picture on the asbestos paper may be placed on some other transparent or translucent material to form the composite product. For example, transparent or translucent paper, parchment, cellulose acetate, etc., can be used, or even another sheet of asbestos, properly treated to give a transparent or translucent sheet.

In a similar manner to that described for the reproduction of pictures, letters and reading matter and writing, drawings, etc., may be used and reproductions made. One can readily see that in this way accurate photographic reproductions may be prepared from any printed or written or drawn matter made with suitable ink, and this without the use of a camera.

If the asbestos paper be treated with a sensitive emulsion such as is used in making ordinary photographic material like plates, films, papers, etc., reproductions or images may be made photographically on the asbestos paper. For example, the pictures made in the form of "slides" above described may be used and prints made from them on such treated or sensitized asbestos paper.

The composite slides, etc., may also be used for other purposes, for example, for lamp shades, etc.

The following specific description will illustrate another specific embodiment of my invention:

The absorbent asbestos paper, above described, was used for copying letters written with copying ink, such as is used in mimeographic work. The asbestos sheet with the copy was then made transparent, for example, by applying white shellac with a little castor oil to make it more pliable. An asbestos sheet made with colloidal aluminum silicate, and coated with a layer of varnish, becomes sufficiently transparent so that the printed matter or reproduction can be readily seen through it. The resulting asbestos sheet with the reproduced matter is pasted on a piece of paper of suitable quality, thus giving a composite product made up of the asbestos sheet with the reproduced matter, and the paper to which it is secured.

Instead of making the asbestos sheet transparent before applying it to the paper, the asbestos copy may be first pasted on the paper, the wrong side up, and then made transparent, when the copied or reproduced matter, writing, etc., will appear correctly and not reversed.

By first reversing the original matter desired to be copied, and then copying it on the asbestos paper, a correct copy can be obtained directly on the asbestos paper so that it will not be necessary to make the asbestos sheet transparent in order that the reproduced matter may be seen, but such asbestos sheet may be directly placed on or combined with a suitable paper to give a composite sheet.

Such composite products, made of asbestos paper with the image reproduced on it, together with ordinary paper, have the property when subjected to treatment with fire that the paper back will burn off, or will be charred, leaving the asbestos and the print or image intact if the ink used is fire-resistant, as is the case with inks containing metallic compounds, such as iron compounds. For example, where black oxide of iron is used suspended in mucilaginous matter, the image formed by it, or the printing or writing formed by it, will remain even after the paper back may be burned off. Such composite products, made in part or in whole of asbestos paper, with the image applied to the asbestos paper, are very valuable in preserving important documents, bonds, paper-money, books, drawings, etc. from destruction by fire, while the paper or cloth or other part of the composite article will give the asbestos tensile strength and other desirable properties until such time as fire may destroy this part of the composite article and leave only the asbestos part of it with the image thereon, or with the printing or writing or other matter thereon.

Modifications of the above described matter and composite articles such as will suggest themselves to those skilled in the art are included in the invention.

When copying on the asbestos material pictures, etc. made with a water soluble ink and color, the copying onto the asbestos paper can of course be effected by moistening the paper only with water. Such inks, which are water soluble will be particularly desirable also when preparing books or other material for children's amusement, where even uninflammable ink solvents are less desirable than ordinary always procurable water. The children may even prepare the pictures themselves with such suitable water soluble material or pigments, even where the pigments are themselves insoluble, but suspendable in water by the use of gums, mucilage or other suitable material. If such pictures or other images or writings are suitably prepared, and transferred to the asbestos paper, many copies may be prepared from the same print, or many reproductions may be made on the asbestos paper of the same original picture or print. The asbestos sheet with the copy or print can then be combined with some suitable surface, which may have strength and be untearable if desired, and composite products obtained, such as slides, films, as well as pictures on more or less opaque and translucent surfaces, suitable for gifts or presents, can be obtained.

When the prints on the asbestos paper are treated with varnish, or other suitable material, they become translucent, and, in certain cases, transparent, as well as water proof, so that the pictures are washable, as described in my pending application, Serial No. 505097.

In certain cases the asbestos may first be spread over the surface of the other material and the copy then prepared on the same, thus giving the composite product by a somewhat different method of preparation. So, also, in certain cases, the material may be printed from type, etc. on to the asbestos directly, either before or after combining with another or other surfaces.

It will thus be seen that the invention provides new and improved composite articles or objects, particularly pictures or images or reproductions of printed or written or other matter; and that the composite objects are made up of an asbestos layer or sheet of an absorbent character which carries the picture or other reproduced matter, and another layer or layers which may advantageously be of a character adapting the composite article for its intended purpose. For example, for making slides, etc., a glass plate may be used in combination with the asbestos sheet. For making other composite objects, a paper or other layer adding strength to the composite sheet may be used, while still giving a composite product which is flexible. By treating the composite sheet, or the asbestos paper after the image has been reproduced on it, with a suitable varnish, the sheet can be made translucent or transparent, or may be waterproof. So also, by securing the asbestos paper to a glass or other backing by means of a solution such as sodium silicate, a composite article or object or reproduction is obtained in which the picture or image is emphasized by the action of the sodium silicate solution upon such parts of the asbestos paper as do not have the image absorbed or appearing on it.

I claim:

1. A composite sheet or article made up in part of a sheet of translucent asbestos and in part of a surface of some other material.

2. A composite sheet or article made up in part of a sheet of translucent asbestos paper, said asbestos paper being in combination with the surface of some material of a translucent nature.

3. A composite sheet or article comprising a sheet of translucent asbestos paper with printed or copied matter together with material of a translucent nature, to the surface of which the asbestos paper is secured.

4. A composite sheet or object comprising a layer of translucent material and translucent asbestos paper with printed or copied matter thereon, said asbestos paper being secured to the surface of the translucent material.

5. A composite object comprising a glass layer having non-inflammable translucent paper with printed or copied matter thereon, secured to the surface of the glass.

6. Composite slides comprising a glass layer, a layer of translucent asbestos with pictures, letters, prints, etc., carried thereby, said asbestos layer being secured to the glass surface.

7. A slide of glass having secured thereto by a sodium silicate solution a sheet of asbestos paper of an absorbent character having printed or copied matter thereon.

8. A composite sheet or object made up of translucent asbestos paper in combination with a sheet or layer of another material to which the asbestos paper is secured, and which other material will give strength to the composite object.

9. A picture or other reproduction of a composite character, the reproduction being on translucent asbestos paper, and the asbestos paper being combined into an integral composite object by securing the asbestos paper to the surface of a translucent or transparent material by some suitable adhesive.

10. A composite object comprising a glass surface having asbestos paper secured thereto by an inorganic adhesive.

11. A composite object comprising a glass surface having secured thereto by means of sodium silicate a sheet of asbestos paper made with colloidal aluminium silicate as a binder.

12. The method of making a composite object containing a picture or other reproduction, which comprises reproducing the object upon asbestos paper, and securing the sheet of asbestos paper to a layer or sheet of material of a different character by means of a suitable adhesive.

13. The process of preparing translucent and transparent pictures and other reproductions, which comprises transferring the material to be reproduced on to asbestos paper, rendering the asbestos paper translucent or transparent, and securing the resulting asbestos paper by suitable adhesive to a translucent or transparent surface.

14. The method of making a composite object which comprises securing a sheet of asbestos paper to a glass surface by means of sodium silicate.

NATHAN SULZBERGER.